May 5, 1925.  
W. L. LINDGREN  
1,536,112  
DIFFERENTIAL GEAR DRIVE FOR AUTOMOBILES, ETC  
Filed May 17, 1924
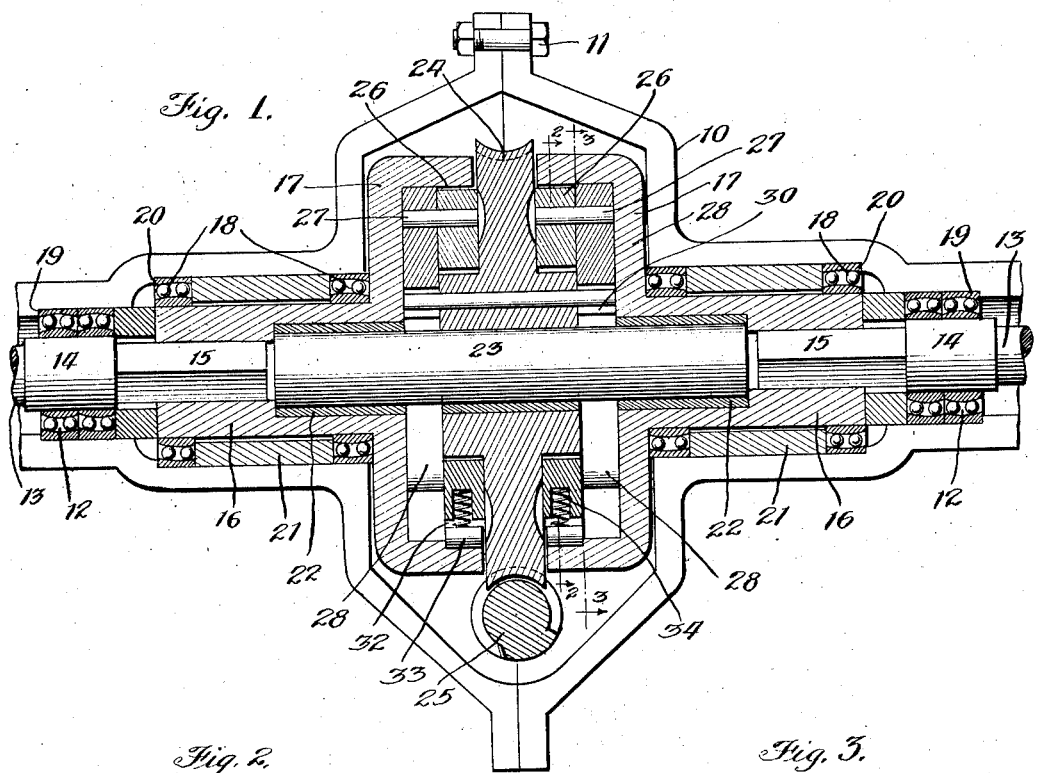
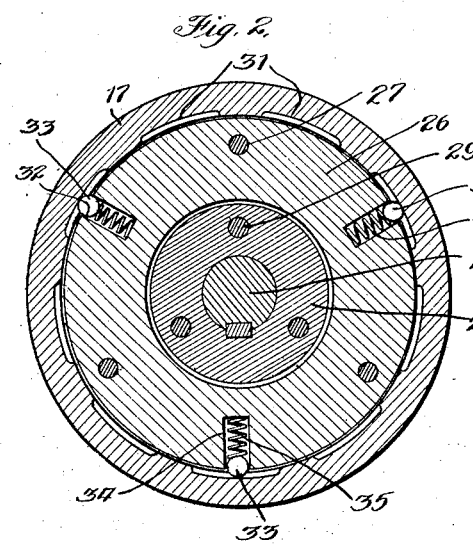
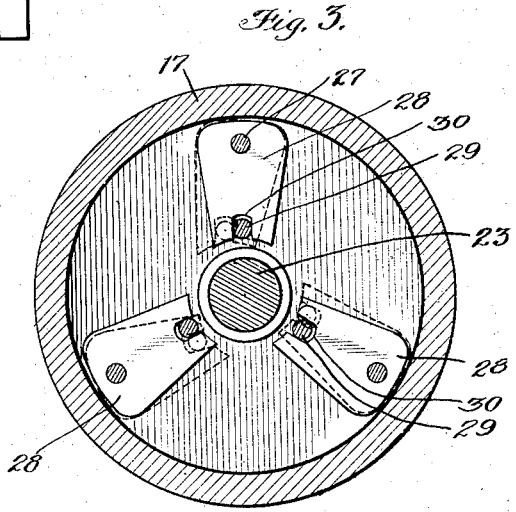
Inventor:
Waldemar L. Lindgren
By John Howard McElroy
his Atty.

Patented May 5, 1925.

1,536,112

UNITED STATES PATENT OFFICE.

WALDEMAR L. LINDGREN, OF CHICAGO, ILLINOIS, ASSIGNOR, BY DIRECT AND MESNE ASSIGNMENTS, TO ALFRED A. NORTON, TRUSTEE, OF CHICAGO, ILLINOIS.

DIFFERENTIAL-GEAR DRIVE FOR AUTOMOBILES, ETC.

Application filed May 17, 1924. Serial No. 713,919.

*To all whom it may concern:*

Be it known that I, WALDEMAR L. LINDGREN, a citizen of the United States, and a resident of Chicago, in the county of Cook and State of Illinois, have invented certain new and useful Improvements in Differential-Gear Drives for Automobiles, Etc., of which the following is a specification.

My invention is concerned with differentials, such as are employed in driving the rear wheels in automobiles, and is designed to produce a device of the class described whereby when the automobile is being driven in a straight line, the power will be applied equally to both wheels, and whereby when it is turning, the power will all be applied to the wheel on the side toward which the turn is being made, while the other wheel is disconnected from the power and is free to turn, running at a greater speed than the other wheel to which the power is applied.

To illustrate my invention, I annex hereto a sheet of drawings, in which the same reference characters are used to designate identical parts in all the figures, of which,—

Fig. 1 is a central vertical section through a differential embodying my invention; and, Figs. 2 and 3 are views in section on the lines 2—2 and 3—3 respectively, of Fig. 1.

In carrying out my invention as applied to an automobile, it will be understood that I preferably employ a gear casing 10 which is made up of a pair of symmetrical castings secured at their peripheries by the bolts 11 in the customary manner, the other ends (not shown) of the castings being suitably supported from the chassis in the customary manner. Journaled in suitable bearings at said outer ends, and preferably in the ball bearings 12 at their inner ends, are the shafts 13 connected at their outer ends to the rear wheels, and preferably provided with the enlargements 14 upon which the ball bearings are mounted. The inner ends of these shafts 13 are preferably squared, as seen at 15, and fit snugly in correspondingly shaped apertures extending through the outer ends of the hubs 16 of the cup-shaped driven members 17, which in turn are mounted, preferably by a pair of ball-bearing rings 18, in the casing 10, the casing having suitable annular shoulders 19 for the rings of the bearings 12 to rest against, and similar shoulders 20 for the outer rings of the outer bearings 18, the two bearings 18 for each cup being spaced apart by the sleeve 21 interposed between them for that purpose. The inner portions of the apertures through the hubs 16 are enlarged and circular in cross section to receive the bearing cylinders 22 for the ends of the supporting shaft 23, which has secured on the central portion thereof the driving disk 24, which where the drive is by the worm shaft 25, will have its periphery provided with worm gearing teeth. The edges of the cups 17 approach closely to the driving gear 23, and placed just inside of the cups and adjacent to the gear are the rings 26 which have secured therein the three bearing pins 27, upon which are fulcrumed the three clutch dogs 28, which have their inner ends suitably connected with the disk 24 so that they can be swung by said disk through a few degrees. These connections preferably consist of the three pins 29, which are passed through suitable apertures in the driving gear 24 and have their ends extending into the recesses 30 formed in the clutch dogs 28.

The operation of the device is as follows:

Assuming that the driving shaft 25 is driven by the engine of the automobile through the customary change speed gearing, when the automobile is being driven straight forward, both of the driven members 17 will be clutched to the driving member 24 by reason of the fact that the pins 29 acting to deliver power to the clutch dogs or levers 28 will rotate said levers on their fulcrum pins 27 and rock the same so that their eccentric ends will be jammed against the inner periphery of the annular portions of the cups 17, as indicated in dotted lines in Fig. 3. So long as the machine is traveling straight ahead, this clutching action on both disks remains constant, and it will be obvious that if the machine is backed, the same action will occur, only the clutch dogs will be thrown to the opposite shifting position from that shown in dotted lines in Fig. 3. When the power is shut off, the driving disk 24 stops, and the continued movement of the cups 17 under the inertia of the wheels will carry the dogs 28 to their radial position shown in full lines in Fig. 3, in which they offer no obstacle to the forward movement of the wheels.

Assuming that the front wheels are turned so as to drive the vehicle on a curve, the power will still continue to be applied to the rear wheel on the side toward which the turn is being made, but the clutch on the other side will be rendered inoperative by reason of the fact that the other wheel has to rotate at a greater rate of speed on account of its greater radial distance from the center about which the turn is being made, and as a consequence it straightens out the dogs 28 on that side by reason of its tendency to turn them, and inasmuch as the pins 29 cannot be shifted, the ring 26 on that side is advanced with the more rapidly rotating wheel enough so that the dogs 28 on that side can resume their radial position in which they do not interfere with the rotation of the wheel on that side at a faster speed than the driven wheel.

While the structure thus far described is theoretically operative, I have found that it is not reliable under some conditions which necessitate the instant action of the clutch, such as stopping quickly by slowing down the motor, or where one clutch has to be released in making a turn. If the the weather is cold, and the grease in the differential hardens, the dogs 28 may not shift quickly by the friction of the inner periphery of the cups 17 on their ends and thus acting on the ring 26 to bring it into disengaging position. To insure the movement of the ring 26 under such conditions, I form in the inner periphery of the cups 17, in the vertical plane of the rings 26, a plurality of elongated shallow recesses 31 preferably having their ends bevelled or rounded off and in the rings 26 I form preferably a plurality of radially extending recesses of sufficient depth and width to receive the rollers 33, and permit their inward movement so that they can engage either the recesses 31 or the intervening surfaces on the inner periphery of the cup 17. To hold the rollers yieldingly in engagement with the co-operating surfaces of the inner periphery of the cup 17, I drill in the bottom of the recesses 32, the pockets 34 to receive the helically coiled expanding springs 35. In the event that the dogs 28 on the outside wheel tend to remain in their clutching position when a turn is made, the now more rapidly moving cup 17 on that side will have the edges of its recesses 31 engage the rollers 33, and by the resulting additional friction or resistance move the ring 26 to move the dogs 28 to their radial, clutch releasing position.

In case the automobile tends to coast down a hill, so that the speed of the wheels from the coasting exceeds the driving speed of the engine, the engine will control its speed as follows: Assuming that the shaft 23 in Fig. 3 is being driven anti-clockwise and the engine is driving the car, the dogs 28 will be in clutched dotted line position. If the auto begins to coast, the cup 17 will move faster than the shaft 23, and will tend to move the dogs 28 to their full line position relative to the ring 26, but to do this, the ring 26 will have to be moved forward relative to the shaft 23. This movement is checked by the ends of the recesses 31 engaging the rollers 33, and it does not stop when the dogs 28 are in their full line position of Fig. 3 but it continues until they have been swung on to the other clutching position, not shown in their full or dotted lines, in which the dogs clutch again, and the coasting is resisted by the engine.

I am aware of the structure shown in the prior art patent to Sowden, No. 1,422,144, dated July 11, 1922, and do not claim the same as my invention.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a differential, the combination with a central driving disk and means for rotating the same, of a pair of cup-shaped driven disks facing each other on opposite sides of the driving disk, a pair of rings in the cup portions of the driven disks adjacent the driving disk both peripheries proper of each of said rings being out of engagement with their respective disks, a clutch dog pivoted on each of said rings co-operating with the inner periphery of the cups, and connections between the driving disk and the clutch dogs to rock the same as the driving disk is rotated relative to the driven disks.

2. In a differential, the combination with a central driving disk and means for rotating the same, of a pair of cup-shaped driven disks facing each other on opposite sides of the driving disk, a wheel shaft connected to the hub of each of said driven disks, a pair of rings in the cup portions of the driven disks adjacent the driving disk both peripheries proper of each of said rings being out of engagement with their respective disks, a clutch dog pivoted on each of said rings co-operating with the inner periphery of the cups, and connections between the driving disks and the clutch dogs to rock the same as the driving disk is rotated relative to the driven disks.

3. In a differential, the combination with a central driving disk and means for rotating the same, of a pair of cup-shaped driven disks facing each other on opposite sides of the driving disk, a wheel shaft connected to the hub of each of said driven disks, a short shaft upon which the driving disk is secured having its ends journaled in the hubs of the driven disks, a pair of rings in the cup portions of the driven disks adjacent the driving disk both peripheries proper of each of said rings being out of engagement with their respective disks, a clutch dog pivoted on each of said rings co-operating with the inner periphery of the cups, and connections between the driving disks and the clutch dogs to rock the same as the driving disk is rotated relative to the driven disks.

4. In a differential, the combination with a casing, of a worm shaft rotating therein, a central driving disk with the periphery of which said worm meshes, a pair of cup-shaped driven disks facing each other on opposite sides of the driving disk, a pair of rings in the cup portions of the driven disks adjacent the driving disk both peripheries proper of each of said rings being out of engagement with their respective disks, a clutch dog pivoted on each of said rings co-operating with the inner periphery of the cups, and connections between the driving disks and the clutch dogs to rock the same as the driving disk is rotated relative to the driven disks.

5. In a differential, the combination with a central driving disk and means for rotating the same, of a pair of cup-shaped driven disks facing each other on opposite sides of the driving disk, a pair of rings in the cup portions of the driven disks adjacent the driving disk, a clutch dog pivoted on each of said rings co-operating with the inner periphery of the cups, connections between the driving disk and the clutch dogs to rock the same as the driving disk is rotated relative to the driven disks, and friction devices operating between the outer peripheries of the rings and the inner peripheries of the cups.

6. In a differential, the combination with a central driving disk and means for rotating the same, of a pair of cup-shaped driven disks facing each other on opposite sides of the driving disk, a pair of rings in the cup portions of the driven disks adjacent the driving disk, a clutch dog pivoted on each set of rings co-operating with the inner periphery of the cups, connections between the driving disk and the clutch dogs to rock the same as the driving disk is rotated relative to the driven disks, and friction devices operating between the outer peripheries of the rings and the inner peripheries of the cups, said friction devices consisting of spring pressed rollers located in the outer peripheries of the rings and co-operating recesses formed in the inner peripheries of the cups.

In witness whereof, I have hereunto set my hand this 8th day of May, 1924.

WALDEMAR L. LINDGREN.

In the presence of witness—
JOHN HOWARD MCELROY.